(12) United States Patent
Shah

(10) Patent No.: US 7,390,282 B2
(45) Date of Patent: Jun. 24, 2008

(54) DIRECTIONAL SHIFT IN HYDROSTATIC DRIVE WORK MACHINE

(75) Inventor: Vaibhav H. Shah, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 258 days.

(21) Appl. No.: 11/034,147

(22) Filed: Jan. 12, 2005

(65) Prior Publication Data

US 2006/0150624 A1    Jul. 13, 2006

(51) Int. Cl.
    *F16H 61/40* (2006.01)
(52) U.S. Cl. ................. 477/68; 477/107; 477/110
(58) Field of Classification Search .......... 477/68, 477/107, 110, 904
    See application file for complete search history.

(56) References Cited

U.S. PATENT DOCUMENTS

| | | | |
|---|---|---|---|
| 3,733,931 A * | 5/1973 | Nyman et al. ................ | 477/69 |
| 4,203,293 A * | 5/1980 | Bubula et al. ................ | 60/490 |
| 5,624,339 A | 4/1997 | Coutant et al. | |
| 6,042,502 A * | 3/2000 | Cronin et al. ................ | 477/68 |
| 6,409,628 B1 * | 6/2002 | Kuras ........................ | 477/69 |

\* cited by examiner

*Primary Examiner*—David D. Le
(74) *Attorney, Agent, or Firm*—Liell & McNeil

(57) ABSTRACT

A method of performing a directional shifting event in a hydrostatic drive work machine, and a hydrostatic drive work machine is provided. The method includes the step of adjusting a pump displacement of a variable displacement pump coupled with an engine and a hydraulic motor of the work machine, at a rate based at least in part on one or both of a predetermined acceleration limit and a predetermined jerk limit of the work machine. The work machine includes an electronic control module having a computer readable medium with a directional shifting control algorithm recorded thereon. The control algorithm is operable to adjust a pump displacement in a hydrostatic drive of the work machine at a rate based at least in part on one or both of the predetermined acceleration limit or jerk limit of the work machine.

15 Claims, 1 Drawing Sheet

DIRECTIONAL SHIFT IN HYDROSTATIC DRIVE WORK MACHINE

TECHNICAL FIELD

The present disclosure relates generally to hydrostatic drive work machines, and relates more particularly to a process and software control algorithm for directional shifting in such a machine.

BACKGROUND

Hydrostatic or "hystat" drive refers generally to a drive train or portion of a drive train in a work machine utilizing hydraulic fluid pressurized by engine rotation as the motive force for propelling the work machine. In a typical design, a pump is driven with an output shaft of the engine and provides pressurized hydraulic fluid to a hydraulic motor, in turn coupled with one or more axles of the work machine. In most hystat drive work machines, the pump and motor each have a variable displacement, allowing the relative torque and speed of a drive shaft to be continuously varied.

Where it is desirable to provide a relatively high torque to the work machine wheels or tracks, the displacement of the motor will be relatively large such that at a given hydraulic pressure from the pump, a relatively large force is transferred to the drive shaft and wheels or tracks for each stroke of the motor. Similarly, where it desirable to provide a relatively lower torque to the work machine wheels or tracks, for example, when operating the work machine at relatively higher velocity, the relative displacement of the motor can be decreased. Displacement of the pump can be similarly adjusted, creating a continuously variable coupling between the engine and the ground engaging wheels or tracks of the work machine.

While the combination of a variable displacement pump and variable displacement motor in a hystat work machine imparts tremendous flexibility in operation, there is room for improvement. Particularly in work machine applications that require relatively frequent directional changes, for example, loader operations, the wear and tear on the work machine and even the operator can be significant.

Most if not all traditional hystat work machines require the operator to manually control one or more of the hydrostatic drive components. In many common hystat designs, the direction of fluid flow between the pump and motor is reversed to change the direction of motor rotation, and in turn change the direction of rotation of a drive shaft. In order to change fluid flow direction where the pump is manually controlled, the operator must decrease the fluid flow in the first flow direction, then increase fluid flow in the opposite direction. Wheel brakes, engine brakes, or other slowing means may be simultaneously employed to slow the work machine to a stop prior to reversing directions.

Reducing pump displacement, or "downstroking" the pump also provides a retarding force on the work machine. Increasing pump displacement, or "upstroking" the pump tends to accelerate the vehicle. Meanwhile, engine rotation continues to drive the pump, the engine speed being based predominantly on throttle position, also controlled by the operator, and a load on the engine. Accordingly, where an operator wishes to switch directions, he or she must attempt to integrate all of the various accelerating and decelerating forces applied to the work machine to execute a smooth and efficient directional change, often a challenging or impossible task.

It is generally desirable for an operator to perform a directional shift relatively quickly, simply to maximize the rate at which the work machine can move around the work environment and perform its various tasks. Thus, operators will typically attempt to slow the work machine, reverse fluid flow between the pump and motor, and accelerate as quickly as possible. However, the various hystat components, and the work machine itself are not without limitations.

Where an operator adjusts the pump or motor too quickly, he or she risks stalling or overspeeding the engine, or accelerating the work machine too quickly. Where the rate of work machine acceleration changes too quickly, the work machine can jerk. Overly large accelerations or changes in acceleration can be not only uncomfortable for the operator, but can risk spilling loads carried by the work machine.

Highly skilled operators can typically execute directional shifts relatively rapidly and smoothly. However, many modern hystat systems simply have too many variable components for a single operator to attend to both shift duration and shift smoothness without sacrificing one for the other. For instance, no skill level can enable an operator to optimally control a changing pump displacement, motor displacement, throttle position, etc., all simultaneously. In other words, even operators with many years of experience can find it difficult or impossible to consistently reverse travel directions in the work machine without jerking or overly accelerating the same, or overly extending shift duration to avoid excessive acceleration or jerk.

In an attempt to assist operators in performing directional shifts both smoothly and efficiently, designers have developed various systems wherein an electronic controller performs the adjustments of one or more of the components in the hydrostatic drive during shifting. While these systems have shown some improvements over earlier designs, the operator is still responsible for controlling certain of the components. The operator's control can thus still limit shifting speed, for example, if the operator adjusts the pump or motor too slowly, or compromise smoothness, for example, if the pump or motor is adjusted too quickly. Moreover, different operators can have different personal shifting preferences. While one operator may be willing to undergo significant jostling during a shift, if the shifting duration is minimized, other operators may be unwilling or unable to tolerate jerks or rapid accelerations.

Co-owned U.S. Pat. No. 5,624,339 shows a method for controlling shift points in a continuously variable transmission that includes a hydrostatic drive path or a combined hydrostatic and mechanical transmission drive path. The mechanical transmission includes a planetary summing arrangement that appears to allow for smooth shift without disruption of torque. Although this strategy and structure appears promising, there always remains room for improving upon the overall combination of work efficiency with rider comfort.

The present disclosure is directed to one or more of the problems or shortcomings set forth above.

SUMMARY OF THE INVENTION

In one aspect, the present disclosure provides a method of performing a directional shifting event in a hydrostatic drive work machine. The method includes the step of adjusting a pump displacement of a variable displacement pump coupled with an engine and a hydraulic motor of the work machine, at a rate based at least in part on one or both of a predetermined acceleration limit and a predetermined jerk limit of the work machine.

In another aspect, the present disclosure provides an article having a computer readable medium with a control algorithm recorded thereon. The control algorithm includes means for shifting between forward and reverse directions in a hydrostatic drive work machine having a variable displacement pump. The means for shifting further includes means for adjusting a pump displacement at a rate based at least in part on one or both of a predetermined acceleration limit and a predetermined jerk limit of the work machine.

In still another aspect, the present disclosure provides a hydrostatic drive work machine. The work machine includes an engine, a variable displacement pump coupled with the engine, and at least one hydraulic motor connected with the pump. An electronic control module is provided and is in control communication with the pump. The electronic control module includes an article with a computer readable medium having a control algorithm recorded thereon, the control algorithm including means for shifting between forward and reverse travel directions in the work machine, the means for shifting including means for adjusting a displacement of the pump at a rate based at least in part on one or both of a predetermined acceleration limit and a predetermined jerk limit of the work machine.

DETAILED DESCRIPTION

Figure 1:
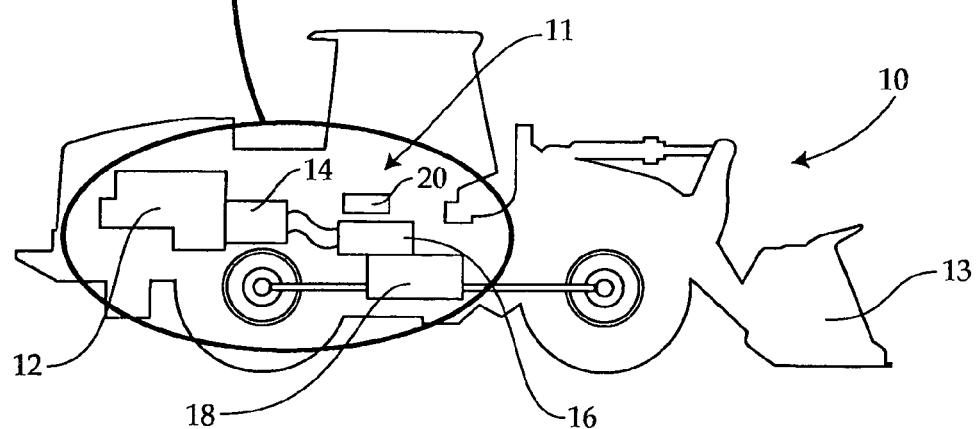
FIG. 1 is a diagrammatic side view of a hydrostatic drive work machine according to a preferred embodiment of the present disclosure.

Referring to FIG. 1, there is shown a hydrostatic drive work machine 10. Work machine 10 includes a hydrostatic drive 11 disposed therein, including an engine 12, a variable displacement pump 14, a variable displacement motor 16 and a gearbox or transmission 18. An electronic control module 20 is further provided, and is operable to electronically control various of the components of hydrostatic drive 11 during a directional shift, as described herein. Work machine 10 is illustrated as a loader having a bucket 13, however, it should be appreciated that FIG. 1 is exemplary only, and work machine 10 might be any of a wide variety of hydrostatic drive machines, many of which are known in the art.

Work machine 10 may be equipped with a set of controls which allow the operator to adjust an engine throttle and control travel direction with a conventional control handle or lever. In one embodiment, the operator will push forward on the control handle to move work machine 10 in a forward direction, and will pull backward on the handle to move work machine 10 in a reverse direction. To reverse travel direction, the operator will simply push or pull the control handle accordingly. In certain contemplated embodiments, additional control levers or buttons, for example, will enable the operator to selectively manually adjust various of the work machine components, including one or more of the components of hydrostatic drive 11, as described herein.

It is further contemplated that electronic control module 20 will be operable to electronically control all of the components of hydrostatic drive 11 during a directional shift, without any input from the operator other than commanding the shift itself. For certain applications, however, it may be desirable for the operator to have manual control over one or more of the components of hydrostatic drive 11 during a directional shift. Accordingly, the operator controls can be designed such that an input from the operator will override electronic control module 20. The operator may wish to interrupt, delay or temporarily suspend the various adjustments in hydrostatic drive 11 attendant to performing a directional shift, for example, if an obstruction is detected. In particular, work machine 10 may be equipped with wheel or engine brakes, which when activated may override or supplement actions being taken by electronic control module 20.

Figure 2:
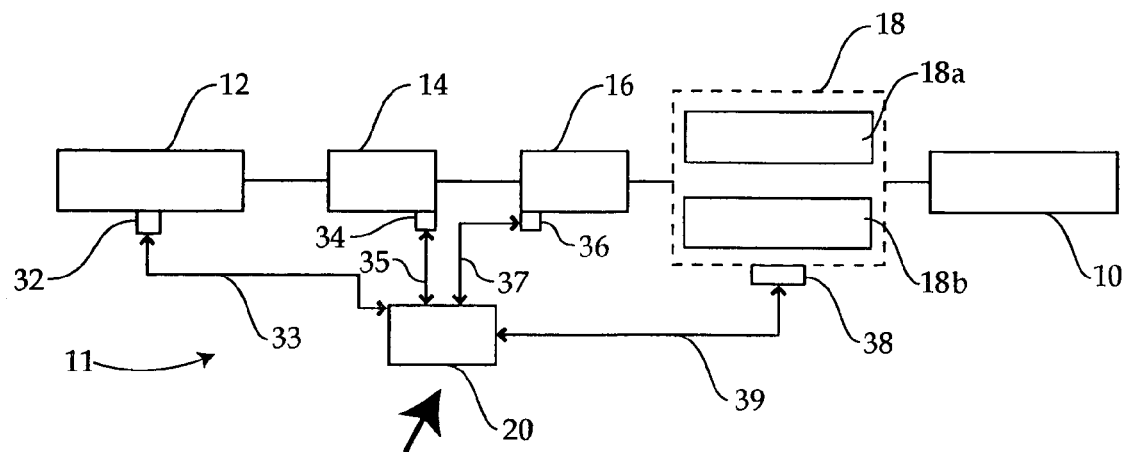
FIG. 2 is a schematic view of a hydrostatic drive and electronic control system suitable for use with the work machine of FIG. 1.

Referring also to FIG. 2, there is shown a schematic of hydrostatic drive system 11. Electronic control module 20 is connected to, and in control communication with, a throttle actuator 32 via a communication line 33. In one embodiment, electronic control module 20 is operable to adjust a position and/or rate of change in position of an engine throttle by adjusting actuator 32. Electronic control module 20 can thus control the fueling and speed of engine 12, or rates of change thereof. Work machine 10 may be further equipped with a conventional throttle control whereby the operator can manually adjust throttle position, for example, utilizing an accelerator pedal.

Another communication line 37 may connect electronic control module 20 with a motor actuator 36, allowing electronic control module 20 to adjust a position or rate of change in position of motor 16. Motor 16 may be a variable displacement motor similar in design to pump 14, described herein, and adjustment of the position of motor actuator 36 adjusts a relative displacement of motor 16. A manual motor controller, for example a control lever, may also be positioned within reach of the operator in work machine 10 such that he or she can manually control motor actuator 36.

Electronic control module 20 may further be in control communication with a transmission actuator, preferably a clutch actuator 38, via a communication line 39. Transmission 18 will typically include at least a low gear 18a and a high gear 18b, although more than two gears may be employed in other applications without departing from the intended spirit and scope of the present disclosure. Clutch actuator 38 will thus typically comprise two clutch actuators, operably coupled one with each of gears 18a and 18b, in a conventional manner. For clarity, only a single transmission/clutch actuator is illustrated.

Work machine 10 may also include conventional clutch pedals or control levers such that the operator can selectively engage or disengage the clutches as desired. In such an embodiment, the operator can manually shift work machine 10 between high and low gears, in either of forward or reverse travel directions. Electronic control module 20 may also be programmed such that upshifting and downshifting takes place automatically, in consideration of such factors in work machine 10 as throttle position, work machine speed, transmission output speed, motor displacement and pump displacement. Even where electronic control module 20 automatically controls shifting in transmission 18, work machine 10 may be designed such that the operator can override the electronically controlled shifting, either by simply manually adjusting the clutches or by disabling the control functions of electronic control module 20.

Electronic control module 20 may further be connected to, and in control communication with, a pump actuator 34 via a communication line 35. Control module 20 will typically be operable to adjust a position and/or rate of change in position of pump 14 with actuator 34. Manual controls may be provided in work machine 10 such that the operator can manually adjust pump displacement. Pump 14 may be a bi-directional variable displacement swash plate pump, wherein adjustment of the position of a body of pump 14 relative to its swash plate adjusts the displacement thereof, in a manner well known in the art.

The term "bi-directional" should be understood to refer to a pump that is capable of pumping hydraulic fluid in either of two directions. In such an embodiment, the angle of the swash plate of pump 14 relative to the body thereof can vary between a maximum displacement at a first, for example positive, displacement orientation for forward travel of work machine 10, and a second, for example negative, displacement orientation for reverse travel of work machine 10. Where the swash plate is at a zero angle relative to the pump body, the displacement is zero, i.e. the pump is displacing no fluid while rotating, and is placing a minimum load on engine 12. Where the relative swash plate angle is adjusted from the zero angle toward the positive displacement orientation, pump 14 displaces an increasing amount of fluid to motor 16 in a first direction. Conversely, where relative swash plate angle is adjusted toward the negative displacement orientation, pump 14 displaces an increasing amount of fluid to motor 16 in a second, reverse direction. The disclosure also contemplates other pump types with bi-directional capability by other means known in the art.

The fluid coupling of pump 14 with motor 16 allows a relative swash plate angle of pump 14 to determine the direction and flow rate of fluid that is pumped to motor 16. Thus, moving pump 14 from the positive displacement orientation, through the zero displacement orientation, and finally toward the negative displacement orientation can gradually switch fluid flow from a maximum in the first direction to a maximum in the second direction. In this fashion, adjustment of displacement of pump 14 can reverse the direction that motor 16 is rotating and thus reverse the direction of power to the wheels or tracks of work machine 10, and ultimately the travel direction thereof.

Motor 16 is similar to pump 14 in that its displacement may be varied by adjusting an angle of a drive plate or swash plate associated therewith. In one embodiment, motor 16 is adjustable between a maximum, positive displacement orientation and a minimum displacement orientation, relatively close to or at zero. Thus, motor 16 is not bi-directional, although a bi-directional motor might be used without departing from the scope of the present disclosure.

Electronic control module 20 will include an article having a computer readable medium with a control algorithm recorded thereon. The control algorithm includes means for shifting between forward and reverse travel directions, or the opposite, in work machine 10. In other words, the same control algorithm may be responsible for shifting from forward to reverse or from reverse to forward. The means for shifting broadly includes means for adjusting a displacement of pump 14, for example between its positive, or first, displacement orientation and its negative, or second, displacement orientation, at a rate based at least in part on one or both of a predetermined acceleration limit and a predetermined jerk limit of work machine 10. Hence, unless otherwise commanded by the operator, work machine 10 and the operator will typically not be subjected to accelerations or jerks above predetermined limits during directional shifting, as described herein.

The predetermined acceleration limit can be generally understood to be the maximum rate at which it is desirable to change the velocity of work machine 10, by either slowing down or speeding up. While the predetermined acceleration limit can vary based on numerous factors, described herein, peak accelerations of approximately positive or negative 0.3 g or less, have been found to be both attainable and acceptable in work machine 10. Thus, in one embodiment, the predetermined acceleration limit might be set at approximately 0.3 g. Jerk is the rate of change in acceleration and, hence, the jerk limit can be generally understood to be the maximum rate at which it is desirable to increase or decrease the acceleration of work machine 10. Jerk values of approximately positive or negative 1.5 g/s or less, have been found to be both attainable and acceptable in work machine 10. Thus, in one embodiment, the predetermined jerk limit might be set at approximately 1.5 g/s. Those skilled in the art will recognize that these numbers reflect satisfactory perceptions from most operators most of the time. There will often be a minority of operators that are more aggressive or less aggressive. Other considerations could be utilized in arriving at these predetermined limits. For instance, these limits might be regulated by a government agency.

It should be understood that it is generally desirable, though not required, that directional shifting of work machine 10 take place as rapidly as possible without exceeding the predetermined acceleration and jerk limits. Thus, pump displacement, and motor displacement, where adjusted, will be changed at a rate that yields changes in work machine velocity and acceleration that are as close as practicable to the predetermined acceleration limit or jerk limit without exceeding the same.

By controlling directional shifting in work machine 10 as described herein, shift duration can be as fast as practicable, and thus work machine operating efficiency can be improved. This will reduce the time required to perform specific work machine tasks, such as moving a pile of material, providing improvements over earlier designs wherein directional shifting was often protracted. In earlier systems, it was possible and common for an operator to unduly extend directional shifting duration to ensure that he or she was not subjected to excessive jerking and acceleration. The present disclosure allows adjustment of each component necessary to effect a directional shift to take place at a relatively high rate, without exceeding operating thresholds, as described herein.

The terms predetermined acceleration limit and predetermined jerk limit should be further understood to include quantities that are calculated, inferred or estimated on-the-fly, i.e. during operation, as well as pre-programmed quantities. Where such limits are determined during operation, several variables, including work surface type, slope, work machine load weight or type, etc. might be integrated by electronic control module 20 to determine how quickly work machine 10 can accelerate, or how quickly it can change its rate of acceleration.

It is contemplated, however, that preprogramming the electronic control modules of plural work machines based on preexisting test or simulation data will be a practical implementation strategy. The particular operating parameters may be determined by actual tests on a machine, for example, utilizing one or more accelerometers and incorporating the determined limits into the control software, or by computer simulation that models various operating conditions, or by a combination of both approaches.

In one contemplated embodiment, the acceleration and jerk limits will be determined through skilled operator testing. Over the course of many hours of work machine operating experience, operators can develop relatively repeatable shift procedures, based generally on their own preferences. Thus, to determine a limit such as an acceleration or jerk limit, an operator will perform a specific task, such as moving a pile of material. The operator will be allowed to directionally shift the work machine as quickly as he or she wishes to. The work machine can be equipped with various monitoring devices, such as accelerometers, to allow the operating parameters of each directional shift to be recorded. Numerical values for a maximum desirable acceleration and/or jerk can thus be determined, and later programmed into electronic control module 20.

Further, in certain jurisdictions it may be required to limit jerking and excessively accelerating a work machine and its operator. Thus, externally provided limits might be used in conjunction with the present disclosure to arrive at the acceleration and jerk thresholds programmed in the control algorithm of electronic control module 20. In a similar vein, customer or operator requests for relatively more or less aggressive shifting might be incorporated into the control software, even if some smoothness or efficiency must be sacrificed. Thus, while it is contemplated that a balance of smoothness and efficiency will be sought when setting the predetermined acceleration and jerk limits, it should be understood that this balance may vary depending upon many different factors, as described herein.

Further still, the predetermined acceleration limit and predetermined jerk limit might be parameters that can change based upon operating conditions or environments, for example, different types of work surfaces, slopes or work machine loads. Thus, electronic control module 20 might be programmed with plural limits, and the particular limits selected by an operator based upon conditions. For example, for a relatively high friction surface such as pavement, a typical work machine will experience relatively little or no slip on the work surface when accelerating. In contrast, a relatively lower friction surface such as ice will allow the work machine to slip across the surface as it slows or speeds up. Accordingly, the relative limits pre-programmed into electronic control module 20, or calculated during operation, may be selected depending upon the operating or environmental conditions.

In one embodiment, the control algorithm performs the entire directional shift event solely by adjusting the displacement of pump 14, without changing displacement of motor 16, throttle position in engine 12 or the position of clutch actuator 38 and hence clutch pressure. Where pump displacement is adjusted toward a zero displacement during work machine operation, the quantity of hydraulic fluid per each pumping stroke of pump 14 will gradually decrease, slowing work machine 10 in a manner well known in the art.

Adjustment of the displacement of pump 14 can thus be used to slow work machine 10 toward a zero ground speed. Although a variable angle swash plate pump 14 is described herein, alternative types of variable displacement pumps might be used. Further still, rather than a single pump that is bi-directional, and adjustable between positive and negative orientations, multiple pumps having different pumping directions, or some other type of reversible flow pump than a swash plate pump might be used without departing from the scope of the present disclosure.

As pump 14 reaches zero displacement, the net hydraulic pressure provided to motor 16 from pump 14 will approach zero. As displacement of pump 14 begins to increase toward an opposite, negative displacement orientation, hydraulic pressure will increase and fluid will begin to flow in an opposite direction through motor 16, initiating rotation of the same. Thus, in at least some instances, the entire directional shift in work machine 10 can be executed simply by adjusting the angle of the swash plate of pump 14, moving pump 14 from its first displacement orientation to its second displacement orientation, or the reverse.

Whether adjustment of pump 14 alone can be used to directionally shift work machine 10 will depend on various factors, including engine speed and the sum of the various forces retarding work machine 10. For example, where engine 12 is running relatively fast, for example, under a high throttle setting, the rotation rate of pump 14 will be relatively faster and accordingly, work machine 10 may be relatively more difficult to slow to a stop. In such an instance, motor 16 and/or engine throttle adjustment may be necessary to help slow work machine 10. Conversely, where other forces are slowing work machine 10, it may be relatively easier to slow, and pump 14 alone will be sufficient. For example, where work machine 10 is traveling up a slope, it will inherently slow down more readily than if it is traveling downhill. In such an instance, pump 14 alone may provide sufficient retarding force on work machine 10 to slow the same.

Embodiments are contemplated wherein electronic control module 20 includes plural control algorithms for directional shifting, for example a first control algorithm whereby only pump 14 is used to directionally shift, and a second control algorithm wherein pump 14 and one or both of motor 16 and throttle actuator 32 are used to directionally shift. The same or another control algorithm may be recorded on electronic control module 20 having logic for selecting among the possible directional shifting strategies, for example, based on inputs from various sensors in work machine 10 that determine retarding forces thereon.

Thus, in another embodiment, the control algorithm of electronic control module 20 may perform the directional shift event by adjusting both of the motor displacement and the pump displacement, initiating the adjustments thereof at appropriate times, as described herein. The process typically begins by increasing, or upstroking, the displacement of motor 16, at a rate based at least in part on one or both of the predetermined acceleration limit and the predetermined jerk limit of the work machine. At or close to a point at which motor 16 reaches an elevated displacement, for example, a maximum displacement, the control algorithm will initiate adjusting of the displacement of pump 14. The subsequent adjustment of pump 14 will typically take place by adjusting the same from the first displacement orientation toward the second displacement orientation, at a rate based at least in part on one or both of the predetermined acceleration limit and predetermined jerk limit of work machine 10. In the instant embodiment, adjustment of pump 14 may take place in a manner similar to the preceding embodiment wherein only the pump displacement is adjusted to effect the directional shift.

Motor 16 will typically be maintained at or close to the elevated displacement from a point in time at or close to initiation of adjustment of pump displacement until a point in time at or close to termination of adjustment of pump displacement. Once the step of adjusting displacement of pump 14 is concluded, e.g. pump 14 reaches its second displacement orientation, the displacement of motor 16 may be reduced as work machine 10 accelerates. In other words, the entire duration of adjustment of pump displacement typically takes place while motor 16 is maintained at or close to an elevated, typically maximum displacement. The shift event further may take place without adjusting the speed of engine 12, throttle position, or clutch pressures thereof. In the instant embodiment, increasing the displacement of motor 16, or "upstroking" the same, imparts a retarding force to the work machine axle(s), slowing work machine 10 in a manner well known in the art.

In this fashion, work machine 10 is initially slowed by motor 16, at a rate that approaches but does not exceed the predetermined acceleration and/or jerk limits. Subsequently, adjustment of displacement of pump 14 from a first displacement orientation toward the zero displacement orientation further slows work machine 10, to a momentary stop. Once pump 14 has passed the zero displacement orientation, and begins to move toward its second displacement orientation, work machine 10 is accelerated in an opposite direction. At the point in time at which pump displacement is at a maximum, in the second displacement orientation, motor 16 will typically still be at its maximum displacement, providing the maximum torque to the work machine axle(s). Accordingly, maximum torque will be available to accelerate work machine 10. As work machine 10 reaches an increased velocity, motor displacement will be decreased toward a minimum displacement, reducing the torque applied to the ground engaging wheels or tracks in a manner well known in the art.

In yet another embodiment, the control algorithm performs the directional shift event by simultaneously adjusting the displacement of pump 14 as well as the displacement of motor 16, both at rates based at least in part on the predetermined acceleration limit or predetermined jerk limit of work machine 10. It may be desirable to employ such a strategy where, for example, the responsiveness of one or both of pump 14 and motor 16 is relatively slow, making it desirable to begin adjustment of both of pump 14 and motor 16 at the initiation of the directional shift. System responsiveness and the relative hardware sizes, pump and motor size in particular, in hydrostatic drive 11, may determine the relative capacities for retarding and accelerating work machine 10 with pump 14 and motor 16, and may thus influence the choice of which strategy to employ.

The instant embodiment is similar to the immediately preceding embodiment, however, rather than maintaining motor displacement at a maximum during adjustment of pump displacement, motor 16 is upstroked to its maximum displacement, coinciding typically with a point in time at which pump 14 is at the zero displacement orientation, then downstroked toward a decreased displacement, reaching the same at or close to a point in time at which pump displacement reaches its second displacement orientation. Thus, pump 14 and motor 16 are used simultaneously to slow work machine 10 to a zero speed, which it will typically reach at a point in time coinciding with maximum motor displacement and zero pump displacement. Work machine 10 is thenceforth accelerated in the reverse direction, simultaneously increasing displacement of pump 14 and decreasing displacement of motor 16.

In still another embodiment, the control algorithm performs the directional shift event by adjusting both the displacement of pump 14, and the throttle position of engine 12 with throttle actuator 32, without adjusting the displacement of motor 16. Such an embodiment is similar to a process wherein the pump displacement alone is adjusted to effect a directional shift, however, at or close to the time at which adjustment of pump displacement is initiated, electronic control module 20 may command throttle actuator 32 to adjust the engine throttle and decrease the engine speed toward a predetermined reduced engine speed. The predetermined reduced engine speed may be calculated, for example, based on the rate at which work machine speed can be slowed by adjusting the displacement of pump 14, in other words the relative capacity of pump 14 to retard work machine 10. By decreasing engine speed, slowing of work machine 10 with pump 14 can be more readily effected. Moreover, where pump displacement is reduced, engine 12 will typically increase in speed with the decreased resistance provided by the downstroking pump. Reducing engine speed can thus lessen the risk of overspeeding engine 10.

Similar to the foregoing embodiments, hardware size will at least in part determine whether it is desirable to adjust throttle position in work machine 10 during a directional shift, and to what degree. For instance, a relatively smaller capacity pump will have a relatively smaller retarding or accelerating effect on work machine 10 for a given degree of adjustment in displacement. Thus, with a relatively smaller pump it may be necessary in many or most cases to supplement the retarding of work machine 10 by reducing engine throttle. With a relatively larger pump, it may be possible to effect the directional shift with pump 14 alone across the whole spectrum of engine speeds, or in cooperation with motor 16.

Once pump 14 has been adjusted from its first displacement orientation to its second displacement orientation, electronic control module 20 will typically command throttle actuator 32 to return the engine speed toward its pre-shift speed, unless otherwise commanded by the operator.

INDUSTRIAL APPLICABILITY

During typical operation of many hydrostatic drive work machines, an operator may wish to change direction many times. One common task involving numerous directional shifts is moving a pile of material, or loading the same into a truck. For example, each time an operator drives into the pile of material and loads the same into a bucket 13 of work machine 10, then backs work machine 10 out of the pile, reversing direction, then again reverses direction to drive forward to a dump site or truck, hydrostatic drive 11 can effect the changes in direction, without requiring any input from the operator other than commanding the shift.

In one exemplary embodiment described herein, pump 14 is used as the sole component in drive 11 to slow and reverse work machine 10, then accelerate it in the opposite direction. Directional shifting with pump 14 alone generally provides relatively equal deceleration and acceleration. In other embodiments, utilizing motor 16 in addition to pump 14 generally provides relatively faster deceleration, and a relatively slower acceleration. When the operator wishes to change directions, he or she will command a shift, for example, by pushing forward or pulling backward on the control lever, to initiate adjustment of displacement of pump 14 and/or motor 16.

For instance, where the operator approaches a pile of material with work machine 10, he or she will typically drive into the pile until the resistance of the material against bucket 13 causes forward travel of work machine 10 to slow significantly or stop. The operator will then command a directional shift, typically once bucket 13 has been filled with material, and work machine 10 will be backed out of the pile with a loaded bucket. Direction will again be changed to drive work machine 10 in a forward direction to a truck or dump site.

Electronic control module 20 may be programmed with a control algorithm, the same or apart from the directional shifting control algorithm described herein, including means for detecting a directional shifting command. The control algorithm further may include means for inhibiting a shift from high gear in a first direction to either high gear or low gear in a second direction. Work machine 10 typically includes both high and low gears, and directional shifting takes place without adjusting any of the clutches. Thus, an attempted directional shift from high gear would require work machine 10 to slow to a momentary stop, then accelerate from the stop in an opposite direction, still in high gear. Such an operation would, at least in some instances, risk stalling work machine 10 or jerking or excessively accelerating work machine 10 during acceleration from the stop.

The control algorithm might, for example, prevent directional shifts while in high gear by inhibiting adjustment of the relative swash plate angle of pump 14 when work machine 10 is above low gear. The control algorithm may further include means for automatically downshifting from a high reverse or high forward, to low reverse or low forward, respectively, prior to executing the directional shift. Thus, if upon commanding a directional shift, high gear 18a is engaged, electronic control module 20 will disengage the high clutch associated with high gear 18b, with clutch actuator(s) 38. Then, electronic control module 20 will engage the low clutch to downshift work machine 10 to low gear 18a, also for example with clutch actuator(s) 38, prior to beginning the adjustment of pump displacement and/or motor displacement. While a dual gear transmission 18 is described, it should be appreciated that work machines having three or more gears or only one gear are also contemplated as falling within the scope of the present disclosure.

Following the appropriate operator command, electronic control module 20 will command pump actuator 34 to begin moving a position of the swash plate of pump 14 to adjust the displacement of pump 14 from its instant, for example, first displacement orientation, toward its second displacement orientation. In a preferred embodiment, pump actuator 34 adjusts the relative angle of the pump swash plate at the described rate, based at least in part on one or both of the predetermined acceleration limit or predetermined jerk limit of work machine 10, as described herein. It will generally be desirable to adjust swash plate angle, and thus pump displacement as quickly as possible without inducing an acceleration or jerk in work machine 10 that exceeds the predetermined acceleration limit and/or jerk limits thereof.

While it is contemplated that many, if not most, work machines operating and designed as described herein, will utilize both a predetermined acceleration limit and a predetermined jerk limit, only one such limit might be incorporated into the control software if desired. For instance, in certain machines, the size and/or responsiveness of the hydrostatic drive hardware may be such that only one of excessive acceleration and excessive jerk is of concern, and the respective electronic control module can be programmed accordingly.

Pump 14 is thus adjusted to lessen the quantity of fluid per unit time that flows to motor 16, slowing work machine 10 without unduly accelerating or jerking the same. Those skilled in the art will appreciate that various means other than rate of change in actuator position are available for controlling the rate at which pump displacement is adjusted. For example, as an alternative to a rate of change in actuator position, the rate at which control module 20 adjusts pump 14 can be incorporated into the control algorithm as a rate of change in the relative swash plate angle of pump 14, for example, monitored with a sensor. Similarly, a rate of hydraulic fluid flow from pump 14 to motor 16, utilizing a flow meter might be used. Further still, real time measurements of acceleration or jerk in work machine 10 might be taken, and the pump displacement modulated to approach but not exceed the predetermined acceleration and jerk limits.

As pump 14 approaches the zero angle displacement orientation, its decreasing displacement will typically have slowed work machine 10 to a point at or close to zero velocity. Actuator 34 may then continue to adjust the swash plate or body of pump 14 through the zero angle displacement orientation of the swash plate and on toward its second displacement orientation. When the swash plate passes the zero angle, fluid will begin to flow in a reverse direction to motor 16, relative to the direction of fluid flow prior to commanding the directional shift. As the relative angle of the swash plate increases toward its second displacement orientation, the relative volume of fluid flowing to motor 16 will increase, increasing the speed of motor 16 and work machine 10.

While the present disclosure is described in the context of slowing work machine 10 prior to executing the directional shift solely with pump 14 and/or motor 16, it should be appreciated that other means can be used to supplement the action of pump 14 and motor 16. For instance, many work machines are equipped with wheel brakes, or engine brakes. Prior to executing a directional shift, the operator may decide to engage either of the wheel brakes or an engine brake to slow work machine 10, for example, where the operator wishes to slow work machine 10 more rapidly than what would be effected solely by adjusting pump 14 and/or motor 16. In such a case, adjustment of pump 14 and/or motor 16 will typically proceed as directed by electronic control module 20, however, work machine 10 will slow at a relatively greater rate. Thus, the work machine operator may slow work machine 10 at a greater rate than would otherwise be permitted within the predetermined acceleration or jerk limits, for example, if he or she detects an obstruction in the travel path of work machine 10. In such a case, it may be more important to quickly stop than it is to avoid excessively accelerating or jerking work machine 10. The wheel brakes might also be electronically controlled so that slowing of the vehicle can be accomplished by appropriate control module commands to the wheel brakes and/or pump and motor.

In other cases, the friction of the work machine wheels or tracks with the work surface, differing loads in the work machine bucket 13, or operation on a slope may all affect the rate at which work machine 10 will slow or accelerate during a directional shift. Embodiments are contemplated wherein electronic control module 20 is programmed to account for varying operating conditions. For example, work machine 10 might be equipped with an inclinometer, allowing electronic control module 20 to adjust pump 14 and/or motor 16 at rates that take into account the relatively greater or lesser ease of slowing and accelerating work machine 10 on a slope. For instance, where work machine 10 is traveling up a slope, and the operator wishes to reverse directions and back down the slope, it will be relatively easier to slow the travel of work machine 10 up the slope. Conversely, where work machine 10 is traveling down a slope, it will be relatively more difficult to slow work machine 10, then accelerate it in a reverse direction up the slope.

In an embodiment wherein engine speed is also adjusted during a directional shift, electronic control module 20 will command an adjustment of throttle actuator 32 to decrease engine speed while the displacement of pump 14 is adjusted, as described herein.

In embodiments wherein displacement of motor 16 is also adjusted to slow work machine 10, electronic control module 20 will command motor actuator 36 to adjust the displacement of motor 16, initially toward an increased displacement, and subsequently toward a decreased displacement, at the times described herein.

The present disclosure thus provides for smoother, more efficient shifting in a hydrostatic drive work machine. By minimizing directional shifting duration, without unduly accelerating or jerking the machine, productivity in work machine operations requiring relatively frequent directional shifts can be improved over earlier designs wherein an operator manually controls directional shifting. For example, in earlier, manual or partially manual hydrostatic drive shifting schemes, an operator risked stalling the work machine, spilling loads, tipping the work machine or at least wasting operating time, if he or she executed a directional shift too quickly or too slowly.

Those skilled in the art will appreciate that in systems operating and designed according to the present disclosure, directional shifting duration is generally related to the smoothness of the shift, as experienced by the operator. In other words, the duration of the directional shift can be reduced to minimize the time required to change travel direction, increasing operating efficiency. However, reductions in shift duration may come with a trade-off in shift smoothness. The balance struck between shifting efficiency and smoothness will depend in large part upon the preferences of the individuals operating work machine 10, or on such factors as jurisdictional regulations, or hardware limitations.

Where relatively delicate tasks are performed by work machine 10, for example, transporting relatively fragile items, it may be desirable to program electronic control module 20 with predetermined acceleration limits and jerk limits that set relatively low thresholds for acceleration and jerk. In such an application, the balance of smoothness versus efficiency may tend more towards smoothness to ensure work machine 10 experiences only relatively minor accelerations or jerks under normal operation to avoid breaking or dropping the fragile items. Where more rugged tasks are at hand, such as moving a pile of gravel, simply performing the operation as quickly as possible may be the primary concern. If the primary risk of significant acceleration or jerk is spilling gravel, the balance of smoothness and efficiency may tilt more toward efficiency, and relatively rapid directional shifts, with relatively larger accelerations and jerks may be acceptable.

Further tuning of the shift smoothness and/or shift efficiency can be achieved with relatively minor adjustments of the control algorithm, based on "soft coded" variables. These include pump and motor size, gear ratios, etc. For a relatively larger pump, the slowing and accelerating effects on work machine 10 will be different than with a relatively smaller pump. Similarly, motor size will affect the relative capacity of motor 16 to accelerate or decelerate work machine 10. The soft-coded variables can be increased or decreased proportionally to control the directional shift aggressiveness.

While it has been generally determined that the rates of adjustment of pump and motor displacement herein should be at least partially linear, those skilled in the art will appreciate that in other applications, partially or wholly non-linear adjustment rates might be employed without departing from the intended spirit and scope of the present disclosure.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. While the embodiments described herein are primarily directed to systems wherein the entire hydrostatic drive of work machine 10 is electronically controlled during a directional shift, alternative embodiments are contemplated wherein an operator controls or can control certain aspects of directional shifting.

For example, while one embodiment utilizes pump 14 as the sole means of slowing and reversing, an operator might selectively manually adjust the displacement of motor 16 to provide relatively more rapid slowing prior to shifting directions, or relatively more rapid acceleration thereafter. Thus, in such an embodiment, electronic control module 20 will set a baseline rate of adjustment of pump 14, but leave adjustment of motor 16 up to the operator. Similarly, an operator might manually control engine throttle, such that if it appears desirable to the operator that engine speed be reduced during directional shifting, he or she can let up on the throttle while directionally shifting to assist in slowing work machine 10, or to avoid overspeeding engine 12.

The present disclosure thus provides a hydrostatic drive work machine 10 wherein directional shifts can be performed relatively smoothly and efficiently, providing a balance between the concerns of shift quality and work machine efficiency. Whether shift quality or efficiency is a more heavily weighted concern can be varied at the discretion of the designer and/or operators. The disclosure further provides a system that is relatively simple to control, and economical. Other aspects, features and advantages will be apparent upon an examination of the attached drawing Figures and appended claims.

What is claimed is:

1. A method of performing a directional shifting event in a hydrostatic drive machine comprising the steps of:
propelling a machine exclusively via a serial arrangement of an engine, a variable displacement pump, a hydraulic motor and a gearbox;
performing a directional shifting event of the machine to change from a first direction to a second opposite direction; and
the performing step including adjusting a pump displacement of the variable displacement pump at a rate based at least in part on one or both of a predetermined acceleration limit and a predetermined jerk limit of the work machine during a transition from the first direction to the second opposite direction.

2. The method of claim 1 comprising the step of slowing the machine by adjusting a throttle position toward a slower engine speed, during at least a portion of a duration of the step of adjusting the pump displacement.

3. The method of claim 1 comprising the step of:
if a transmission of the hydrostatic drive work machine is above a low gear, inhibiting adjustment of pump displacement during a directional shifting event until the transmission is downshifted to the low gear.

4. The method of claim 1 wherein the step of adjusting the pump displacement comprises adjusting the variable displacement pump between a positive orientation and a negative orientation.

5. The method of claim 4 wherein the step of adjusting the pump displacement is executed without adjusting a displacement of the hydraulic motor or a throttle position of the machine.

6. The method of claim 4 comprising the steps of:
during the directional shifting event, upstroking the motor at a rate based at least in part on one or both of the predetermined acceleration limit and the predetermined jerk limit of the machine; and
during the directional shifting event, downstroking the motor at a rate based at least in part on one or both of the predetermined acceleration limit and the predetermined jerk limit of the machine.

7. The method of claim 6 wherein the step of upstroking the motor is initiated at or close to a time of initiating the step of adjusting the pump displacement, and the step of downstroking the motor is initiated at or close to a time corresponding to about zero pump displacement.

8. The method of claim 6 wherein the step of upstroking the motor is initiated prior to the step of adjusting the pump displacement, and the step of downstroking the motor is initiated at or close to conclusion of the step of adjusting the pump displacement.

9. The method of claim 8 wherein, following the step of upstroking the motor, the motor displacement is maintained at or close to an elevated displacement during at least a portion of the step of adjusting the pump displacement.

10. A hydrostatic drive machine comprising:
- an engine;
- a variable displacement pump coupled in with said engine;
- at least one hydraulic motor fluidly connected with said pump;
- a gear box coupled to the at least one hydraulic motor;
- an electronic control module in control communication with said pump, said electronic control module including an article with a computer readable medium having programming executable by said electronic control module recorded thereon;
- said programming including a control algorithm with means for commanding adjustment of a displacement of said pump at a rate based at least in part on one or both of a predetermined acceleration limit and a predetermined jerk limit of the machine during a directional shifting event during a transition in moving in a first direction to moving in a second opposite direction; and
- wherein the machine is propelled exclusively via a serial arrangement of the engine, the variable displacement pump, the hydraulic motor and the gearbox.

11. The machine of claim 10 wherein said variable displacement pump is a bi-directional pump.

12. The machine of claim 11 comprising a gear box coupled with said motor, said gear box having at least a high gear and a low gear, wherein said means for shifting includes:
- means for detecting a directional shifting command of said machine;
- means for inhibiting directional shifting, if said high gear is engaged; and
- means for downshifting from said high gear to said low gear, if said high gear is engaged, prior to directional shifting of said machine.

13. The machine of claim 12 wherein said hydraulic motor is a variable displacement hydraulic motor, said means for shifting further including means for adjusting a displacement of said hydraulic motor at a rate based at least in part on one or both of the predetermined acceleration limit and the predetermined jerk limit of said machine.

14. The machine of claim 13 wherein said means for shifting includes means for selectively initiating or terminating adjustment of at least one of said pump and said motor, based at least in part on a timing of initiating or terminating adjustment of the other of said pump and said motor.

15. The machine of claim 14 wherein said variable displacement pump is a swash plate pump, said machine further comprising:
- a throttle actuator operably coupled with said electronic control module and operable to adjust a position of a throttle in said machine;
- a pump actuator operably coupled with said electronic control module and operable to adjust the relative position of a swash plate of said variable displacement pump relative to a pump body thereof;
- a motor actuator operably coupled with said electronic control module and operable to adjust the displacement of said motor;
- said means for shifting including means for selectively adjusting one or more of said throttle actuator, said pump actuator and said motor actuator at a rate that includes a linear portion; and
- two clutches operably coupled with said electronic control module, each of said clutches being operable to selectively engage one of said high gear and said low gear;
- said means for downshifting including means for selectively engaging or disengaging each of said at least two clutches.

* * * * *